United States Patent

Young et al.

[11] Patent Number: 5,455,467
[45] Date of Patent: Oct. 3, 1995

[54] POWER CONNECTION SCHEME

[75] Inventors: Steven J. Young, Milpitas; Mike Cheponis, Fremont, both of Calif.

[73] Assignee: Apple Computer, Inc., Cupertino, Calif.

[21] Appl. No.: 204,883

[22] Filed: Mar. 2, 1994

Related U.S. Application Data

[63] Continuation of Ser. No. 810,716, Dec. 18, 1991, abandoned.

[51] Int. Cl.⁶ .................................................. H04B 5/00
[52] U.S. Cl. ................................. 307/104; 340/310.07
[58] Field of Search .......................... 336/DIG. 2, 200; 455/41; 340/825.72, 310 CP, 310.08, 310.07; 333/177; 307/3.17, 104; 323/246, 347; 363/15, 16, 95, 97, 123, 131, 178

[56] References Cited

U.S. PATENT DOCUMENTS

| | | | |
|---|---|---|---|
| 2,967,267 | 1/1961 | Steinman et al. | 361/394 |
| 3,549,990 | 12/1970 | Hochheiser | 323/345 |
| 4,038,625 | 7/1977 | Tompkins | 336/DIG. 2 X |
| 4,654,573 | 3/1987 | Rough et al. | 320/2 |
| 4,697,183 | 9/1987 | Jenning et al. | |
| 4,755,783 | 6/1988 | Fleischer et al. | 336/200 X |
| 4,914,561 | 4/1990 | Rice et al. | 363/126 |
| 4,924,171 | 5/1990 | Baba et al. | 323/347 |
| 4,996,638 | 2/1991 | Orr | 363/21 |
| 5,122,729 | 6/1992 | Itoga et al. | |
| 5,157,319 | 10/1992 | Klontz et al. | 336/DIG. 2 X |
| 5,166,965 | 11/1992 | Collier | 336/200 X |

FOREIGN PATENT DOCUMENTS

| | | |
|---|---|---|
| 1570594 | 7/1980 | United Kingdom . |
| 2202414 | 9/1988 | United Kingdom . |
| 2215564 | 9/1989 | United Kingdom . |

OTHER PUBLICATIONS

PCT WO 88/02944, Arthur W. Kelley, "Inductive Coupled Power System", Apr. 21, 1988.
EP 0,357,829, Shigeaki Sano, "Non–Contacting Power Supplying System", Mar. 14 1990.
EP 0,185,610, Michael Jenning, "Einrichtung zur beruhrungslosen Signal–und Energieubertragung", Dec. 20, 1985.
PCT WO 87/.06375, Robert Leonard Billings, et al., "Power Regulator for a Contactless Credit Card System", Oct. 22, 1987.

*Primary Examiner*—A. D. Pellinen
*Assistant Examiner*—Fritz M. Fleming
*Attorney, Agent, or Firm*—Blakely, Sokoloff, Taylor & Zafman

[57] ABSTRACT

A computer that can be electrically coupled to an adapter with wireless inductive connectors. The adapter has a first primary inductive connector that provides power and a second secondary inductive connector that receives digital signals. The computer has a first secondary inductive connector that can receive power and a second primary inductive connector that provides digital signals. The connectors are located within the adapter and computer, so that when the computer is placed adjacent to the adapter, the inductive connectors became electrically coupled.

12 Claims, 3 Drawing Sheets

POWER CONNECTION SCHEME

This is a continuation of application Ser. No. 07/810,716 filed Dec. 18, 1991, now abandoned.

BACKGROUND OF THE INVENTION

1. Field of the Invention

The present invention relates to computer systems and inductive connectors for coupling the same.

2. Description of Related Art

Small "laptop" computers are becoming increasingly popular among users who work outside of an office setting. A typical laptop will contain batteries that power the portable, so that the computer does not have to be plugged into an external power source. The batteries themselves are quite small, thereby limiting the amount of time that the laptop can be operated. Most portable computers are rechargeable so that the same batteries can be used again and again.

Because of the size of a laptop computer, the portables have restricted memory capacity and limited graphic capabilities. For instance, most portables have small liquid crystal display monitors that typically project black and white images. There are times when the user may want to connect the portable to a color monitor. Additionally, many personal computers are incorporated into a network, which allows communication between computer stations. Such a system is particularly useful for relaying messages or transferring electronically stored documents. It is particularly advantageous for the user to hook up the portable into the network, so that data can be transferred from the laptop to the system. For example, a user may have typed in a lengthy report on the laptop while travelling. He may then want to directly transmit the document onto a mainframe or another personal computer, without having to load the information on a floppy disk, or another external storage device. Connecting a portable to such a network would require the attachment of a mechanical connector, typically of the card edge or pin variety. If a monitor and power are to be attached to the laptop, additional connectors must also be plugged into the portable. Attaching the connectors can be time consuming and confusing to a person unfamiliar with computer devices. Mechanical connectors also have a limited insertion life, such that the connectors must be replaced after a certain number of connections. It would therefore be desirable to have a portable computer that can be connected to power and external electrical devices, without the user having to mechanically connect the same.

SUMMARY OF THE INVENTION

The present invention is a computer system which has a computer that can be electrically coupled to an adapter with wireless inductive connectors. The adapter has a first primary inductive connector that provides power and a second secondary inductive connector that can receive digital signals. The computer has a first secondary inductive connector that can receive power and a second primary inductive connector that provides digital signals. The connectors are located within the adapter and the computer, so that when the computer is placed adjacent to the adapter, the inductive connectors become electrically coupled. The adapter is typically connected to an external source of power, so that power can be transmitted through the first connectors to the computer, to operate and possibly recharge the same. The adapter may also be linked to other external devices such as a mainframe or a personal computer network. The transmission of digital signals across the second inductive connectors, allows the computer to communicate with the other devices.

The inductive connectors provide a means to link the computer and adapter by merely placing the two devices adjacent to each other. There is no need to align or mechanically connect the systems. The power induced onto the secondary connectors is a function of the distance between the connectors. The farther apart the connectors are, the less power is transmitted to the secondary connectors. To insure that the proper level of power is received by the secondary connectors, the system has feedback circuits that vary the output of power on the primary connectors as a function of the power induced onto the secondary connectors. If the first primary connector is spaced to far from the first secondary connector, the feedback circuit increases the power on the primary connector. The second connectors have a similar feedback circuit that increases the power of the first signals, accordingly. The present system may also have a pair of third inductive connectors that provide transmission of high speed digital signals between the computer and adapter. The third connectors may allow the computer to be coupled to an external video device, such as a color monitor.

Therefore it is an object of this invention to provide a computer system which allows a computer to be linked with an external power source through a wireless inductive connector.

It is also an object of this invention to provide a computer system which allows digital signals to be transmitted from a computer to an external device through a wireless inductive connector.

It is also an object of this invention to provide an adapter that allows the transmission of both digital signals and power between a computer and external sources.

It is also an object of this invention to provide connectors that can couple two electrical devices without having to mechanically attach or align the connectors.

It is also an object of this invention to provide a computer system that compensates for any excessive spacing between two wireless inductive connectors.

BRIEF DESCRIPTION OF THE DRAWINGS

The objects and advantages of the present invention will become more readily apparent to those skilled in the art after reviewing the following detailed description and accompanying drawings, wherein.

DETAILED DESCRIPTION OF THE INVENTION

Figure 1:
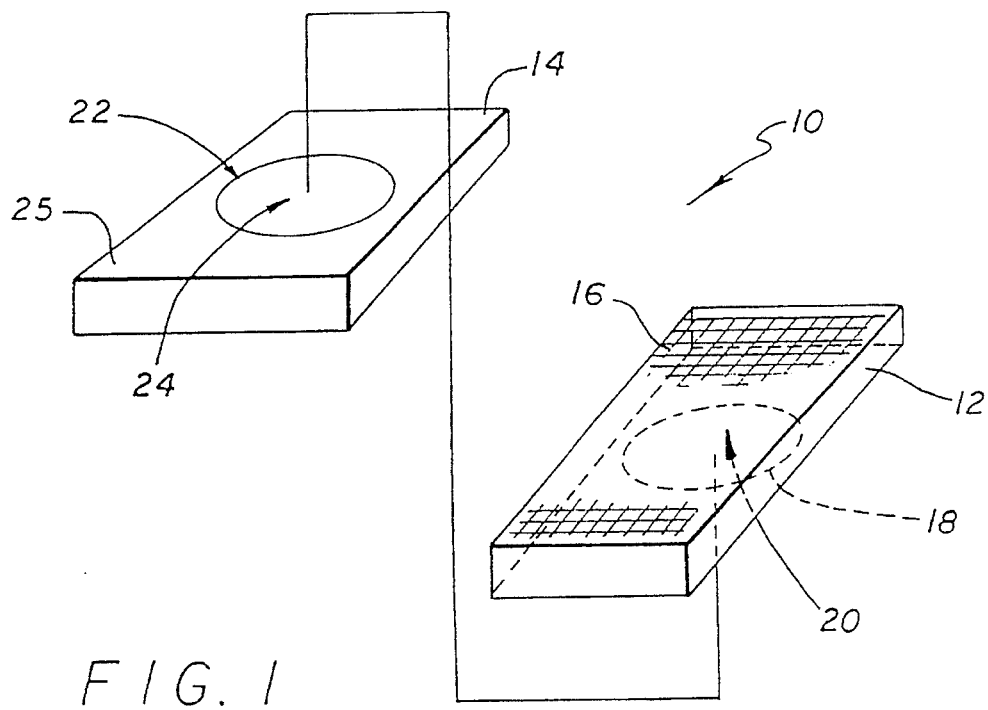
FIG. 1 is a perspective view showing an adapter and a computer of the present invention.

Referring to the drawings more particularly by reference numbers, FIG. 1 shows a computer system 10 of the present invention. The system 10 has a computer 12 and an adapter 14. The computer 12 is typically a portable computer that has its own logic and memory, and is equipped with a monitor and a keyboard. Although a portable computer is described and shown, it is to be understood that the computer 12 can be any electrical device that is to be coupled to another device. For example, the computer 12 may be a desk top personal computer (PC) and the adapter could be an external hard disk drive, wherein the disk drive and PC are coupled together.

The computer 12 has a housing 16 with a flat bottom surface. The housing is typically constructed from a hard plastic, that has a first housing opening 18 which exposes a first secondary inductive connector 20. The adapter 14 has a first adapter opening 22 that exposes a first primary inductive connector 24. The adapter 14 preferably has a housing 25 made from hard plastic and a flat top surface 25. The connectors 20 and 24, are constructed so that when the computer 12 is placed on top of the adapter 14, the connectors are adjacent to each other and electrically coupled together.

Figure 2:
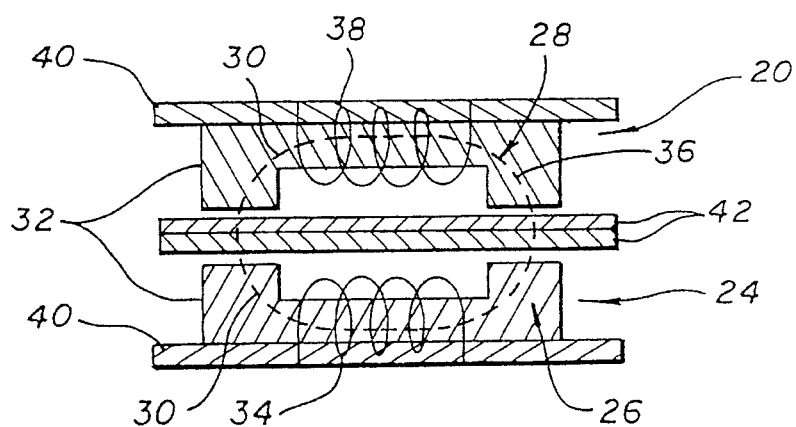
FIG. 2 is a side view showing inductive connectors of the present invention.

As shown in FIG. 2, the first primary connector 24 and first secondary connector 20 may have a primary magnetic core 26 and a secondary magnetic core 28, respectively. In the preferred embodiment, the cores have a base 30 with at least two post 32 extending therefrom. The cores can be constructed from ferrite or any other material having good magnetic properties. Wrapped around the base 30 of the primary core 26 is primary coil 34. The primary coil 34 is typically connected to a source of power, which provides a current that flows through the coil 34. The current in the primary coil 34 creates a magnetic flux 36 that flows through the cores 26 and 28. The magnetic flux 36 induces a current in a secondary coil 38 that is wrapped around the secondary core 28. The coils are typically attached to printed circuit boards 40 that connect the connectors with the accompanying circuitry of the computer 12 and adapter 14. The openings preferably have covers 42 that protect the inductive connectors from the environment. The covers 42 could be eliminated such that the cores could be placed in contact with each other. Although a computer and adapter have been described and shown with openings and covers, it is to be understood that the openings could be eliminated, whereby the magnetic flux generated by the primary coil 34 flows directly through the housings of the computer 12 and adapter 14. The first inductive connectors are typically used to transmit power to the computer 12, to operate and/or recharge the batteries of the same. The adapter 14 can be constructed to plug into a wall socket and provide power to the computer 12.

Figure 3:
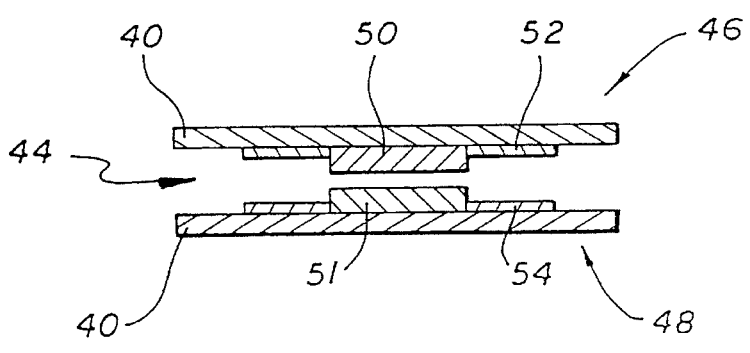
FIG. 3 is a side view of an alternate embodiment of the inductive connectors of FIG. 2.

FIG. 3 shows a preferred embodiment of a second inductive connector 44 that typically transmits digital signals. The second connector 44 has a primary inductive connector 46 attached to the computer 12 and a secondary inductive connector 48 attached to the adapter 14. The second connector 44 allows digital signals to be transmitted from the computer 12 to the adapter 14. The adapter 14 and secondary connector 48 are typically attached to an external device, so that the computer 12 can transmit data to a printer, or another computer, etc. The second connector 44 can be incorporated in place of the first connector, such that the adapter 14 becomes an interface between the computer 12 and the outside world. The second connector can also be used in conjunction with the first connector, so that the adapter 14 provides both an interface and power. In such an arrangement, the computer 12 and adapter 14 could have the first openings for the first connector, and second openings (not shown) for the second connector.

Each second inductive connector may have disk shaped magnetic core 50 and 51. The primary connector 46 has a primary coil 52 extending around the core 50, and the secondary connector 48 has a secondary coil 54 extending around the core 51. When a current flows through the primary coil 52, a magnetic flux is generated that induces a current in the secondary coil.

Figure 4:
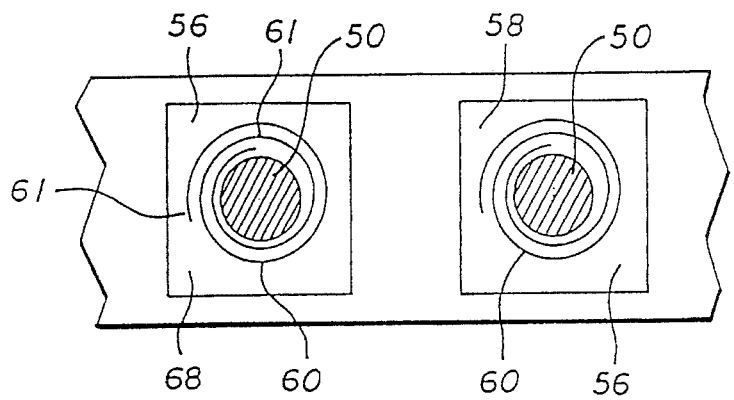
FIG. 4 is a top view showing two inductive connectors of FIG. 3.

As shown in FIG. 4, the coils are preferably constructed as flex circuits 56, that can be easily attached to printed circuit boards 40 which interconnect the coils with the rest of the computer and adapter. The flex circuits 56 are typically constructed as two flexible dielectric sheets 58 that encapsulate a conductor 60. The dielectric 58 is commonly a polyimide and the conductor 60 is a copper sheet etched in the pattern shown. The flex circuit 56 has exposed conductor ends 61 which are soldered to the circuit boards 40. The ends 61 may be exposed by punching an opening in the bottom layer of dielectric 58, before the dielectric sheet is bonded to the copper. The use of the etched copper provides a precise and repeatable number of turns for the inductor, thereby greatly increasing the accuracy and reliability of the connector. The incorporation of the coil into a flex circuit 56 greatly improves the assembly process of the inductors, whereby the coils can be added by merely placing the flex circuit 56 around the cores 50 and soldering the exposed leads 61 to the printed circuit board 40. There is no longer the need to wind wire around the core as is done in the art. Although a digital connector is shown with magnetic cores, it is to be understood that the cores could be eliminated, so that the coils are coupled together in much the same manner as a transmitter and an antennae.

Figure 5:
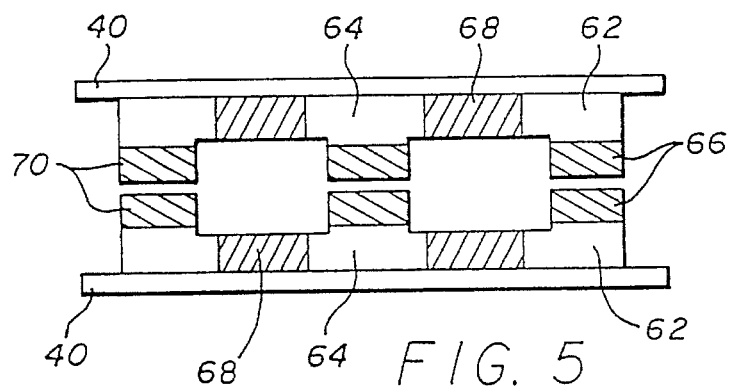
FIG. 5 is a side view of another alternate embodiment of the inductive connector of FIG. 2.
Figure 6:
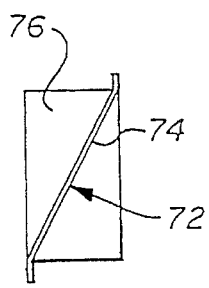
FIG. 6 is a top view of a flex circuit used to create the coils of the inductive connectors of FIG. 5.

FIG. 5 shows a preferred embodiment of an inductive connector, wherein the first and second inductive connectors are combined. The connectors each have an E shaped magnetic core 62 that has a base 64 and three posts 66. The core 62 can be mounted onto a printed circuit board 40 that interconnects the connectors with the rest of the electronics of the computer 12 and adapter 14. First inductive coils 68 are attached to the base 64 between the post 66 of the core 62. Wrapped around the post 66 are second inductive coils 70. As shown in FIG. 6, the coils 68 and 70, are constructed as flex circuits 72 which have a conductor 74 etched as a single line that extends diagonally between two rectangular sheets of dielectric 76. The flex circuits 72 are bonded and wrapped around and around the core 62 to create a circular coil. The ends 75 of the conductors 74 are exposed, so that the coils can be connected to the printed circuit boards 40. The first coils 68 preferably transfer power and the second coils 70 typically transmit digital signals.

Figure 7:
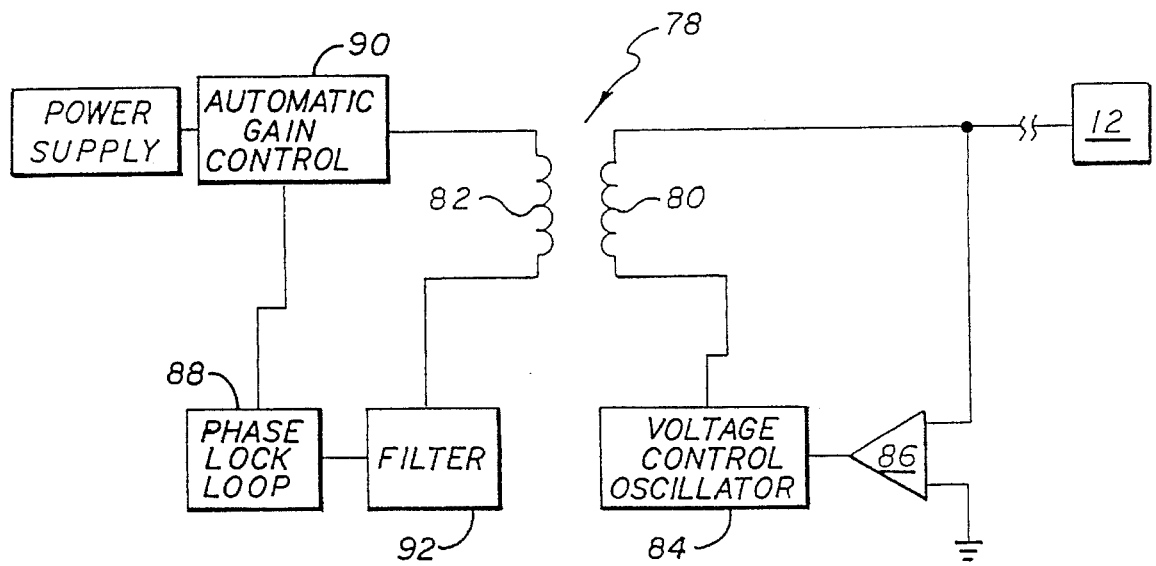
FIG. 7 is a schematic of a feedback system for inductive connectors that transmit power.

The computer 12 and adapter 14 are preferably constructed so that the connectors do not have to be aligned and concentric for the inductors to be electrically coupled. FIG. 7 shows a preferred embodiment of a first circuit 78 that compensates for any misalignment of the first inductive connectors. The first circuit 78 has a first secondary coil 80 that is electrically coupled to a first primary coil 82. The secondary coil 80 is part of the first secondary connector 20 and the primary coil 82 is part of the first primary connector 24. The primary coil 82 and associated circuitry is housed within the adapter 14, while the secondary coil 80 and circuitry are contained within the computer 12. The primary coil 82 provides power typically between 100–300 volts and in a frequency range of 0–100 KHz. When energized, the primary coil 82 induces a current in the secondary coil 80. The power from the secondary coil 80 is drawn by the computer 12 to operate the same. The computer 12 may have batteries that are also charged by the power supplied by the primary coil 82.

Connected to the secondary coil 80 is a first voltage control oscillator (VCO) 84 that provides a first feedback signal. The VCO 84 varies the frequency of the first feedback signal as a function of the voltage across the secondary coil 80, such that the frequency of the first feedback signal decreases as the voltage of the secondary coil 80 decreases and vice versa. An amplifier 86 may be connected between the secondary coil 80 and the VCO 84 to amplify the signal from the coil 80. The first feedback signal is provided to the secondary coil 80 and coupled to the primary coil 82. Attached to the primary coil 82 is a phase lock loop (PLL) 88 that provides a first conversion signal which varies as a function of the frequency of the first feedback signal. The voltage of the first conversion signal increases as the frequency of the first feedback signal decreases and vice versa.

The first conversion signal is supplied to a first automatic gain control (AGC) 90 that varies the power supplied to the primary coil 82 as a function of the voltage level of the first conversion signal. As the voltage of the first conversion signal increases, the AGC 90 increases the power supplied to the primary coil 82. As the first conversion signal voltage decreases, the power supplied to the primary coil decreases. The adapter 14 may have a battery that supplies power, but will typically have a plug that allows the adapter to be connected to a wall socket to provide ac power. When the adapter is connected to ac power, the first circuit 78 may have an ac/dc converter (not shown) connected to the first AGC 90 to convert the ac power to dc. The turn ratio of the primary 82 and secondary 80 coils can vary, so that the first connector can also function as a transformer to reduce the voltage of the secondary coil 80.

The first circuit 78 may have a filter 92 between the primary coil 82 and the PLL 88, to filter out any signals or power outside the range of the first feedback signal. The first feedback signal has a frequency different than the power transmitted across the coils. The filter 92 insures that the PLL 88 senses only the first feedback signal. For example, if the frequency of the power is 20 KHz, the frequency of the first feedback signal can be in the range of 40–60 Khz. The filter 92 can then be a high pass filter that filters out frequencies below 40 Khz, so that the PLL 88 does not pick up noise from the power transmitted across the coils.

In operation, the computer 12 is placed on top of the adapter 14, which energizes the primary coil 82 to transmit power to the secondary coil 80 and computer 12. The VCO 84 sends the first feedback signal back through the coils to the PLL 88, which produces a first conversion signal based on the frequency of the first feedback signal. The AGC 90 then varies the voltage of the primary coil 82, accordingly. The first circuit 78 can be constructed such that the AGC 90 increases the voltage of the primary coil 82, when the voltage level of the first conversion signal exceeds a predetermined value. The predetermined value could correspond to the voltage level of the first conversion signal when the first connectors are completely aligned and concentric. As the connectors are spaced farther apart, the power coupled to the secondary coil 80 typically decreases. To compensate for this, the first circuit 78 increases the power supplied to the primary coil 82 by increasing the voltage of the first conversion signal, which increases as the frequency of the first feedback signal and the voltage of the secondary coil are reduced by the separation of the coils.

The predetermined value could correspond to the first conversion signal voltage when the connectors are spaced apart a predetermined distance. The AGC 90 would be adapted to increase or decrease the voltage of the primary coil 82, depending upon whether the first conversion signal is above or below the predetermined value. If the the first conversion signal is above the predetermined value, then the AGC 90 increases the voltage of the primary coil 82. Likewise, if the first conversion signal is below the predetermined value, then the AGC 90 decreases the voltage of the primary coil 82. The feedback circuit 78 thus insures that adequate power is always supplied to the computer 12 no matter how far apart the connectors are spaced from each other. The user can provide power to the computer 12 without having to mechanically attach or align the connectors. When the computer 12 is removed from the adapter 14, the first feedback signal is no longer sensed by the PLL 88, which drives the first conversion signal voltage to 0 and causes the AGC 90 to switch off the primary coil 82. The first circuit 78 thus provides an electrical switch that turns off the primary coil 82, when the computer 12 is removed and the adapter 14 is not in use.

Figure 8:
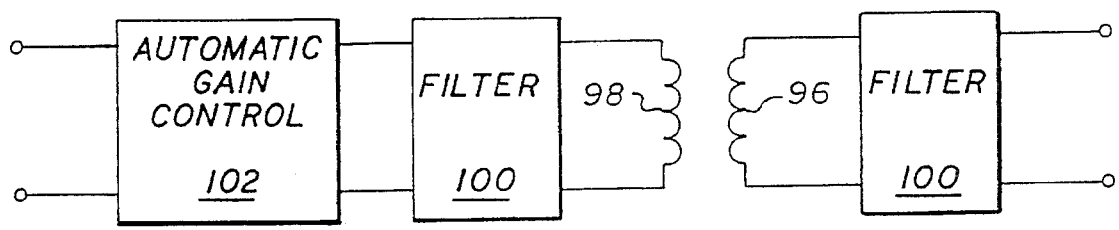
FIG. 8 is a schematic of a feedback system for inductive connectors that transmit digital signals.

FIG. 8 shows a preferred embodiment for a second circuit 94 for the second inductive connectors. The second circuit 94 has a secondary coil 96 coupled to a primary coil 98. The primary coil 98 is typically connected to the computer 12 to provide first digital signals from the computer 12 to the adapter 14. The adapter 14 can be connected to a printer, a network of other computers, or any other external device. The second connector allows the computer 12 to communicate to the external devices through the adapter 14. The frequency of the first digital signals is typically much greater than the power transmitted through the first connectors. For example, the first signals may have a typical frequency of approximately 250 Khz. Attached to each coil is a high pass filter 100, that filters out frequencies lower than the frequency of the first signal. In particular, the filters 100 cut off noise created by the transmission of power from the first primary coil 82 to the first secondary coil 80. The filters 100 allow the first and second connectors to be in close proximity, or combined together as shown in FIG. 5, such that the transfer of power does not interfere with the transmission of the digital signals.

The system may be constructed such that when the computer 12 is placed on top of the adapter 14, the computer 12 sends a handshake signal to the adapter 14. The handshake signal prompts the adapter 14 to send a second feedback signal back through the coils to the computer 12. The second circuit 94 has a second automatic gain control (AGC) 102 that senses the voltage level of the second feedback signal and varies the power of the second primary coil 98, accordingly. In the preferred embodiment the AGC 102 has a peak detector (not shown) that determines the peak voltage of the second feedback signal and compares the peak voltage with a reference value. The peak detector is coupled to an amplifier (not shown) that controls the power across the primary coil 98. If the peak detector detects a second feedback signal voltage that is below the predetermined value, then the AGC 102 increases the power supplied to the primary coil 98. Likewise, if the peak detector detects a second feedback signal voltage that is above the predetermined value, then the AGC 102 decreases the power supplied the primary coil 98.

The second AGC 102 compensates for any misalignment between the second connectors, so that an operational voltage is always induced onto the secondary coil 96. The predetermined value used by the peak detector could be the second feedback voltage when the connectors are aligned, or the feedback voltage when the connectors are separated a predetermined distance. The second feedback signal may be periodically sent by the adapter 14 to update the amount of coupling between the coils. The continuous status check compensates for any movement of the computer 12, while the computer 12 is on the adapter. Although the second circuit 94 has been described as transmitting signals from the computer 12 to the adapter 14, it is to be understood that the second circuit 94 can transmit signals from the adapter 14 to the computer 12 by switching the functions of the coils 96 and 98.

Figure 9:
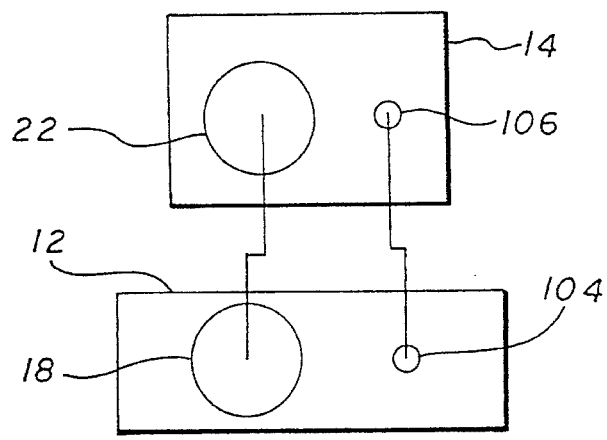
FIG. 9 is a top view of an alternate embodiment of the computer system of FIG. 1, wherein the computer and adapter have a third connector for transferring high speed digital signals.

As shown in FIG. 9, the computer 12 and adapter 14 may have a third primary inductive connector 104 and a third secondary inductive connector 106. The third primary connector 104 is typically attached to the computer 12 and the secondary connector is attached to the adapter 14. The third connectors preferably transmit high speed digital signals with a frequency between 1–100 MHz. Such high speeds signals are usually associated with video display devices. The third connectors thus allow the computer 12 to be connected, through the adapter 14, to an external monitor.

Figure 10:
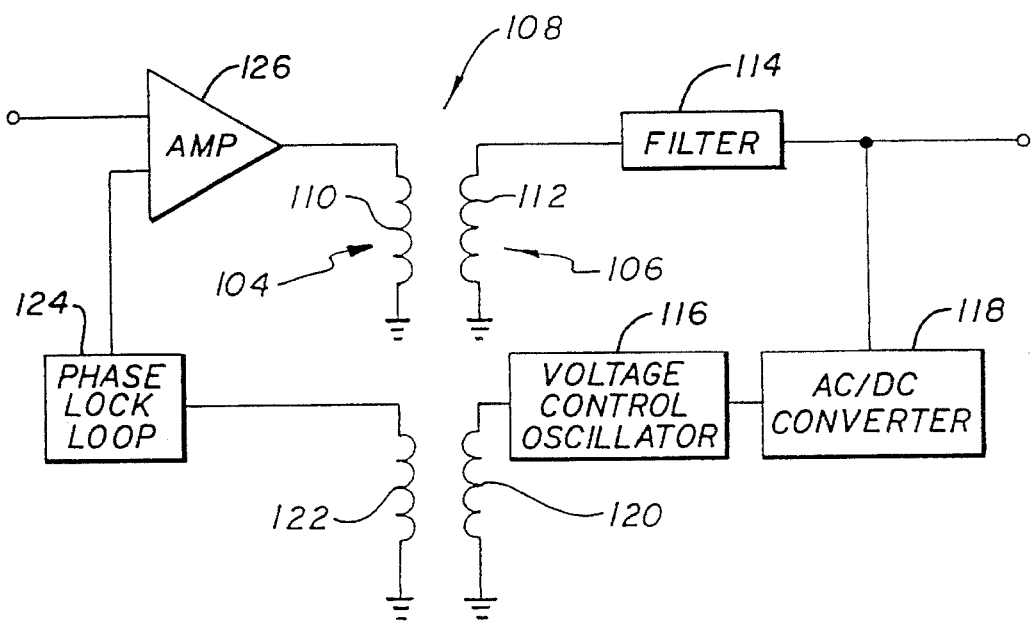
FIG. 10 is a schematic of a feedback system for inductive connectors that transmit high speed digital signals.

FIG. 10 shows a preferred embodiment of a third circuit 108 for the third connectors. The third circuit 108 has a third primary coil 110 that is attached to the computer 12 and coupled to a third secondary coil 112 attached to the adapter 14. The coils 110 and 112, are preferably constructed as flex circuits with circular conductors etched therein, as shown in FIG. 4. The third connectors are preferably assembled without magnetic cores, which would typically slow down the transmission of high speed signals. As an alternative embodiment, the coils 110 and 112 can each be a single linear wire, wherein the primary wire induces a current on the secondary wire.

Attached to the secondary coil 112 is a high pass filter 114 that filters out frequencies below the frequency of the third digital signals. Coupled to the high pass filter 114 and the secondary coil 112 is a second voltage control oscillator (VCO) 116, that provides a third feedback signal as a function of the voltage across the secondary coil 112. The frequency of the third feedback signal decreases when the voltage across the third secondary coil decreases and vice versa. Because of the high speed of the third signals, the third signals simulate ac current. To clean up the third signals an ac/dc converter 118 can be connected between the secondary coil 112 and the second VCO 116, to convert the voltage sensed to a dc level. The second VCO 116 is connected to a fourth primary coil 120 that is coupled to a fourth secondary coil 122. The fourth primary coil 120 transmits the third feedback signal to the fourth secondary coil 122. The frequency of the third feedback signal is considerably less than the frequency of the high speed digital signals. The third feedback signal typically being in the range of 400–800 Hz. Connected to the fourth secondary coil 122 is a second phase lock loop (PLL) 124, that provides a second conversion signal as a function of the frequency of the third feedback signal. The voltage level of the second conversion signal increases as the frequency of the third feedback signal decreases and vice versa. The second conversion signal is inputted into an amplifier 126 to control the power provided to the third primary coil 110. As the voltage of second conversion signal increases, the power supplied to the third primary coil 110 increases. Likewise, when the second conversion signal voltage level decreases, the power to the third primary coil 110 decreases. In operation, as the third coils are moved farther apart, the frequency of the third feedback signal decreases and the voltage of the second conversion signal increases, thereby increasing the power to the third primary coil 110. The third circuit 108 compensates for any misalignment of the third connectors, so that an operative voltage is always induced onto the third secondary coil 112.

While certain exemplary embodiments have been described in detail and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A computer system, comprising:

an adapter that has a first primary inductive connector that is adapted to provide power at a power frequency, and a second secondary inductive connector that receives a first signal at a secondary signal voltage;

a computer that has a first secondary inductive connector that is adapted to receive said power from said first primary inductive connector at a secondary power voltage when said computer is adjacent to said adapter, said computer further having a second primary inductive connector adapted to provide said first signal to said second secondary inductive connector of said adapter;

first feedback means for controlling and maintaining a level of said power supplied by said first primary inductive connector as a function of said secondary power voltage received by said first secondary inductive connector by generating a first feedback signal which is transmitted from said first secondary inductive connector to said first primary inductive connector;

second feedback means for controlling and maintaining a level of said first signal supplied by said second primary inductive connector as a function of said secondary signal voltage received by said second secondary inductive connector by generating a second feedback signal that is transmitted from said second secondary inductive connector to said second primary inductive connector; and, filter means for filtering said power frequency from said first and second feedback signals transmitted to said first and second primary inductive connectors.

2. The system as recited in claim 1, wherein said first primary and secondary inductive connectors each have at least one power coil wrapped around a first magnetic core.

3. The system as recited in claim 2, wherein said first magnetic cores each have a base and at least two posts extending from said base, each said power coil being wrapped around said base between said post.

4. The system as recited in claim 2, wherein said computer and said adapter each have a housing with a connector opening that exposes said first and second, primary and secondary inductive connectors, and each said housing has a printed circuit board connected to said power coils.

5. The system as recited in claim 2, wherein said second primary and secondary inductive connectors each have at least one signal coil wrapped around said first magnetic core.

6. The system as recited in claim 5, wherein said first magnetic cores each have a base and at least two posts extending from said base, each said coil being constructed as a flex circuit wrapped around said base between said post.

7. The system as recited in claim 6, wherein said computer and said adapter each have a housing with a connector opening that exposes said first and second, primary and secondary inductive connectors, and each said housing has a printed circuit board connected to said power and signal coils.

8. The system as recited in claim 1, further comprising a third secondary inductive connector attached to said adapter and a third primary inductive connector attached to said computer, said third primary inductive connector and said third secondary inductive connector being adapted to transmit a second signal when said computer is adjacent to said adapter.

9. The system as recited in claim 8, wherein said second signal of said third primary and secondary inductive connectors has a frequency between 1 and 100 megahertz.

10. The system as recited in claim 9, wherein each said third primary and secondary inductive connector comprises a third coil.

11. The system as recited in claim 9, wherein each said third primary and secondary inductive connector comprises a single linear wire.

12. The system as recited in claim 1, wherein said second primary and secondary inductive connectors each have at least one signal coil wrapped around a second magnetic core.

\* \* \* \* \*